:::

United States Patent
O'Meara et al.

(10) Patent No.: US 9,971,632 B2
(45) Date of Patent: May 15, 2018

(54) SYNCHRONIZATION AND BARRIER FREE CONCURRENT GARBAGE COLLECTION SYSTEM

(71) Applicant: SoundSpectrum, Inc., New York, NY (US)

(72) Inventors: Andrew C. O'Meara, Austin, TX (US); Joel Stanley, Austin, TX (US)

(73) Assignee: SOUNDSPECTRUM, INC., New York, NY (US)

( * ) Notice: Subject to any disclaimer, the term of this patent is extended or adjusted under 35 U.S.C. 154(b) by 29 days.

(21) Appl. No.: 14/939,769

(22) Filed: Nov. 12, 2015

(65) Prior Publication Data

US 2016/0140036 A1    May 19, 2016

Related U.S. Application Data

(60) Provisional application No. 62/079,209, filed on Nov. 13, 2014.

(51) Int. Cl.
  *G06F 9/50* (2006.01)
  *G06F 12/02* (2006.01)

(52) U.S. Cl.
  CPC .......... *G06F 9/5016* (2013.01); *G06F 9/5022* (2013.01); *G06F 12/0261* (2013.01); *G06F 2212/1044* (2013.01)

(58) Field of Classification Search
  CPC ... G06F 9/501; G06F 9/50226; G06F 12/0261
  See application file for complete search history.

(56) References Cited

U.S. PATENT DOCUMENTS

| 6,202,208 B1 * | 3/2001 | Holiday, Jr. | G06F 8/67 707/999.103 |
| 2009/0013017 A1 * | 1/2009 | Branda | G06F 12/0253 |

OTHER PUBLICATIONS

Lindholm et al., The Java Virtual Machine Specification, Addison Wesley, 1997 [retrieved from internet, May 16, 2017][<URL:http://www.cs.miami.edu/home/burt/reference/java/language_vm_specification.pdf>].*

* cited by examiner

*Primary Examiner* — David Yi
*Assistant Examiner* — Nicholas A. Paperno
(74) *Attorney, Agent, or Firm* — Hoffman Warnick LLC (57) ABSTRACT

A system, method and program product for implementing a garbage collection (GC) process that manages dynamically allocated memory in a multithreaded runtime environment. A method is disclosed that includes defining a threshold value, wherein the threshold value defines a number of GC cycles an object must be observed as unreferenced before being reclaimed; traversing objects in an object graph; and reclaiming a traversed object from the dynamically allocated memory if the traversed object has been observed as unreferenced for more than the threshold value.

20 Claims, 2 Drawing Sheets

SYNCHRONIZATION AND BARRIER FREE CONCURRENT GARBAGE COLLECTION SYSTEM

PRIORITY CLAIM

This application claims priority to provisional application 62/079,209, filed on Nov. 13, 2014, the contents of which are hereby incorporated by reference.

BACKGROUND

Garbage Collection ("GC") in computer science refers to the automated management of storage resources (typically dynamically allocated memory) by distinguishing allocations that are in use from allocations that are no longer referenced, which can be reclaimed for reuse. The purpose of any garbage collection system is to simplify software design by freeing software developers from explicitly managing object lifetimes, doing so in a way that impacts runtime performance as little as possible. Garbage collectors allow software developers to focus their efforts on the intricacies of their software's purpose rather than be burdened with the bookkeeping associated with dynamic object allocation and release.

Although GC designs vary, there are generally two design approaches: automatic reference counting ("ARC") and object graph analysis ("OGA"). In general, ARC implementation is straightforward but has inherent limitations while OGA offers a complete solution but comes at the cost of additional runtime overhead. While ARC offers most of the conveniences of a fully garbage collected environment, it requires designers expend significant effort to prevent reference cycles (e.g., object A references B, which references C, which references A). So while ARC can be effective and ease software development, it shifts the burden of memory management from explicit, low-level idioms to higher-level idioms that still require developers to track how and where object references are stored. Thus, developers must expend time and attention ensuring that reference cycles are not formed.

Alternatively, OGA determines which objects are no longer in use by determining which objects are no longer reachable from a set of "root" objects that are known to be anchor points for all objects in use at any given time. The object graph is analyzed in an automated fashion where the GC concurrently traverses the "live" object graph and then repeats the process again and again in successive cycles while user threads concurrently execute. When the GC determines that an object is no longer reachable from the total set of root objects, it infers that the object's allocation is no longer in use and can be reclaimed. OGA importantly does not suffer ARC's reference cycle blind-spot but can potentially degrade runtime performance as the number of objects in the live object graph grows and must be repeatedly traversed.

OGA is regarded as a "true" garbage collection since it completely frees developers from managing object lifetimes and how and where object references are stored. However, OGA load must be amortized evenly so that active user threads remain responsive and do not experience uneven spurts of latency. OGAs that efficiently and robustly support a multithreaded runtime environment are of significant academic interest because of the inherent complexity and design tradeoffs involved, especially when one considers the operational requirements of commercial and scientific computing scenarios which rely so heavily upon them.

"Tri-color mark and sweep," frequently outlined in academic material, is an OGA algorithm that marks objects with "colors" (i.e., meta states) that indicate whether each object is known to be:

(a) in use (i.e., referenced directly by a GC root or indirectly by other objects in use), (b) in use but contains object references requiring sub-traversal, or (c) no longer in use (i.e., not referenced by any objects currently in use)

The "mark phase" of each GC cycle begins by marking the GC roots as (b) and ends when there are no more objects requiring further analysis/traversal. After the mark phase is complete, objects not explicitly marked as being "in use" are therefore unreachable and are implicitly (c) and can be reclaimed. Although tri-color mark and sweep has well-acknowledged success in single-threaded environments, it does not translate well to a multithreaded environment where alterations to the object graph caused by user thread activity occur concurrently with the GC performing OGA. To see the problem, consider a multithreaded environment where the GC happens to traverse an area of the object graph that is simultaneously being altered by a concurrently executing user thread. Inevitably, an object will inadvertently "escape" GC traversal and will therefore mistakenly be regarded as unreachable (and thus be eligible for collection). When the garbage collector attempts to reclaim an escaped object, an internal halt, crash, or data corruption will occur later when the "dangling" object reference is later followed to the now-reclaimed memory region. Note how this issue occurs because the GC witnesses the object graph state during transition due to concurrent user thread activity, not because the principles of live object reachability are flawed.

To address the multithreaded hazards of tri-color mark and sweep, developers add synchronization mechanisms in order to prevent user threads from altering the object graph in ways that could otherwise cause objects to escape and be mistakenly reclaimed. However, frequent and repeated synchronization adds additional runtime overhead that degrades overall user/client code performance. Examples of synchronizing mechanisms are: OS-level synchronization objects, busy-waiting, object transactional analysis, and memory barriers/tripwires that signal when object graph re-marking is required. Some concurrent mark and sweep approaches use more than three colors/states but still require, and are characterized by, frequent and repeated synchronization invocation in order to ensure GC traversal correctness. More specifically, in conventional concurrent mark and sweep GCs, the total sum of synchronization overhead in a GC traversal cycle is proportional to object graph alteration activity (i.e. "Order N" running time). In contrast, a GC is more attractive if the total synchronization overhead for each traversal cycle is fixed and does not depend on user thread activity (i.e., "Order 1" running time). Conventional concurrent OGA implementations are characterized by using synchronization mechanisms to gate object graph alterations that grow with user thread activity.

SUMMARY

A garbage collection system and method for use in a multithreaded runtime environment is provided that reliably identifies unreferenced objects without requiring any additional synchronization overhead per user (or application) alteration of the user object graph.

In a first aspect, the invention provides a method for providing garbage collection (GC) to manage dynamically allocated memory in a multithreaded runtime environment, comprising: defining a threshold value, wherein the threshold value defines a number of GC cycles an object must be observed as unreferenced before being reclaimed; traversing objects in an object graph; and reclaiming a traversed object from the dynamically allocated memory if the traversed object has been observed as unreferenced for more than the threshold value.

In a second aspect, the invention provides a garbage collection (GC) system that manages dynamically allocated memory in a multithreaded runtime environment on a computing system, the GC system comprising: a threshold value, wherein the threshold value defines a number of GC cycles an object must be observed as unreferenced before being reclaimed; a system for traversing objects in an object graph; and a system for reclaiming a traversed object from the dynamically allocated memory if the traversed object has been observed as unreferenced for more than the threshold value.

In a third aspect, the invention provides a computer program product stored on a computer readable storage medium, which when executed by a computer system provides garbage collection (GC) that manages dynamically allocated memory in a multithreaded runtime environment, the program product comprising: program code for defining a threshold value, wherein the threshold value defines a number of GC cycles an object must be observed as unreferenced before being reclaimed; program code for traversing objects in an object graph; and program code for reclaiming a traversed object from the dynamically allocated memory if the traversed object has been observed as unreferenced for more than the threshold value.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

A garbage collector (GC) performing concurrent OGA does not necessarily require that it witness an accurate object graph at every given moment, and only requires that objects that are still in use are never erroneously reclaimed (i.e., it behaves with "correctness"). This observation is the starting point for a concurrent garbage collector that does not make use of frequent and repeated synchronization mechanisms in order to achieve an efficient reclaiming strategy.

A GC historically controls how the object graph alters or "mutates" from moment to moment by gating user (or application) threads through synchronization mechanisms. The present approach removes such synchronization. Instead, correctness is modeled as a superposition of possible discrete states, such that correctness can be achieved as long as any superposition still meets correctness criteria. Specifically, instead of a GC design imposing costly synchronization gates that ensure that the GC always witnesses the object graph in a static state, the present approach forgoes this synchronization requirement and instead allows objects to persist unreferenced for a threshold number of GC cycles before being reclaimed. By carefully analyzing all possible race conditions which could result in an object escaping a given garbage collection traversal cycle ("GC cycle"), a threshold can be estimated or determined, providing a number of GC cycles that ensures an object is never erroneously reclaimed, even though that object can escape being reclaimed for a GC cycle here or there. Objects under this GC process only need to have, e.g., an expanded number of mark states/colors at the relatively-free cost that unreferenced objects persist for additional GC cycles until they are reclaimed.

Figure 1:
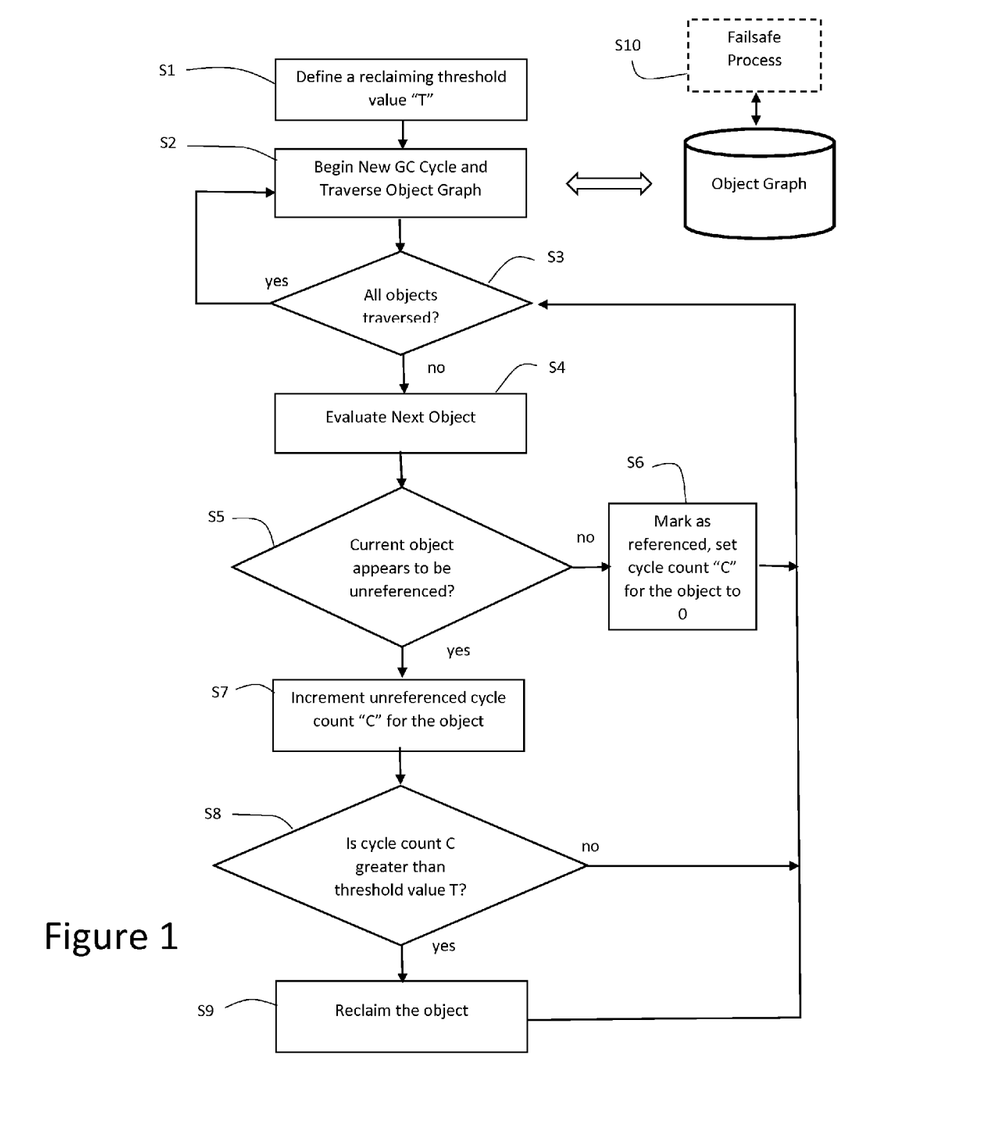
FIG. 1 shows a flow diagram of a garbage collection process in a multi-threaded runtime environment according to embodiments of the invention.

FIG. 1 depicts a flow diagram showing a generalized garbage collection process that uses such an approach, and does not require traditional synchronization. At S1, a reclaiming threshold value T is defined for the GC. T essentially defines the number of GC cycles an object, which appears to be unreferenced, will be allowed to persist. In other words, each object in the object graph will not be reclaimed unless it is observed as being unreferenced for more than T GC cycles. Accordingly, the higher the value of T, the less likely the risk of inadvertently reclaiming an object becomes. In most applications, an illustrative setting for T may, e.g., range between 3-5 in order to provide an extremely high level of confidence that an object will not be inadvertently reclaimed.

At S2, a new GC cycle begins with the object graph being traversed. Assuming all of the objects have not yet been traversed in the current GC cycle at S3, the next object in the object graph is evaluated at S4. In particular, a determination is made whether the object is observed as unreferenced at S5. If the answer is no, then the object is marked as referenced at S6. In this example, this is done by marking the unclaimed cycle count "C" of the object to 0 at S6 and looping back to S3 to continue the GC cycle. However, other marking strategies could be employed.

If the object however appears as unreferenced, the unreferenced cycle count C for the object is incremented at S7. At S8, a determination is made whether the unreferenced cycle count C has exceeded the reclaiming threshold T. In other words, the GC determines if the object has been observed as unreferenced for more than T GC cycles. If no, the process loops back to S3 to continue the GC cycle. If yes, the object is reclaimed at S9 and the process loops back to S3 to continue the GC cycle.

In a typical embodiment, the described process flow may be implemented with two or more threads to handle the main, marking and reclaiming processes. A separate thread that operates outside of the described flow may also be implemented to provide a failsafe process S10. It is recognized that regardless of how high T is set, there will always be some mathematical risk that an object may be inadvertently reclaimed. For example, a user could intentionally or just by chance manipulate objects in an application running in the runtime environment to cause an object to be inadvertently reclaimed. Although the risk may be infinitesimally small, failsafe process S10 may be implemented to avoid such a result. In one illustrative embodiment, failsafe process S10 alters the unreferenced cycle count for an object when certain behavior is observed. For example, if an object is being moved by a user/client thread in the application to a different container object, and the unclaimed cycle count C for the object is near the reclaiming threshold value (e.g., 1 or 2 cycles away), failsafe process S10 can decrement the unclaimed cycle count C. This will then ensure that the object does not get reclaimed if it is then observed as unreferenced the following GC cycle.

The GC traversal process may be implemented in any manner. In one illustrative embodiment, a GC root set is defined to anchor all other in-use dynamically-created user objects (and their sub-objects) in the runtime implementation. A GC root set is the set of all GC roots at any given time; the GC root set specifies the starting points of OGA at the beginning of each GC cycle. Objects that are "in use" include the GC root set and all other objects referenced from the root set, directly or indirectly. All other remaining objects are "unreferenced" and can therefore be potentially reclaimed. Although every object in use will normally be witnessed by the GC each traversal cycle, an object can "escape" a cycle when the GC happens to miss the object just as a user thread moves the object elsewhere in the object graph. Although this is statistically rare, the described process addresses this issue to ensure correctness. Note that while this generally describes user actions, user threads, etc., it is understood that an associated application being executed in the runtime environment for which garbage collection is required needs to be user controlled. The associated application may comprise an automated or autonomous process that does not involve user input.

An object is said to have "escaped" a cycle if it is reachable from a GC root during the cycle, but, due to interleaved user thread modifications to the object graph, the object was not witnessed as referenced. In the above example, T is the maximum number of consecutive cycles a referenced object can escape GC graph traversal due to all possible race conditions resulting from user threads executing concurrently. Depending on the nature of the associated application, T can potentially be calculated for a given GC implementation by examining all permutations of concurrent user thread activity that could cause an object to consecutively escape GC cycles. For example, based on such analysis, it may be observed that it is possible for an object to escape up to four consecutive GC cycles. Accordingly, T can be set so that objects are not reclaimed until they have not been witnessed for five cycles. In other cases, T can simply be estimated and set to a high enough value to minimize the risk to an acceptable level. In either case, the failsafe process described above can be implemented to avoid any escapes.

Note that this described GC implementation technically does contain synchronization objects, but their use does not depend on user object graph mutation and any synchronization is solely used to coordinate GC traversal cycles and sub-phases (and are required in any concurrent GC design and implementation). That is, in the present approach, the total overhead from synchronization mechanisms is fixed and is independent of user object graph mutation while conventional GC designs specifically do not have this characteristic.

Figure 2:
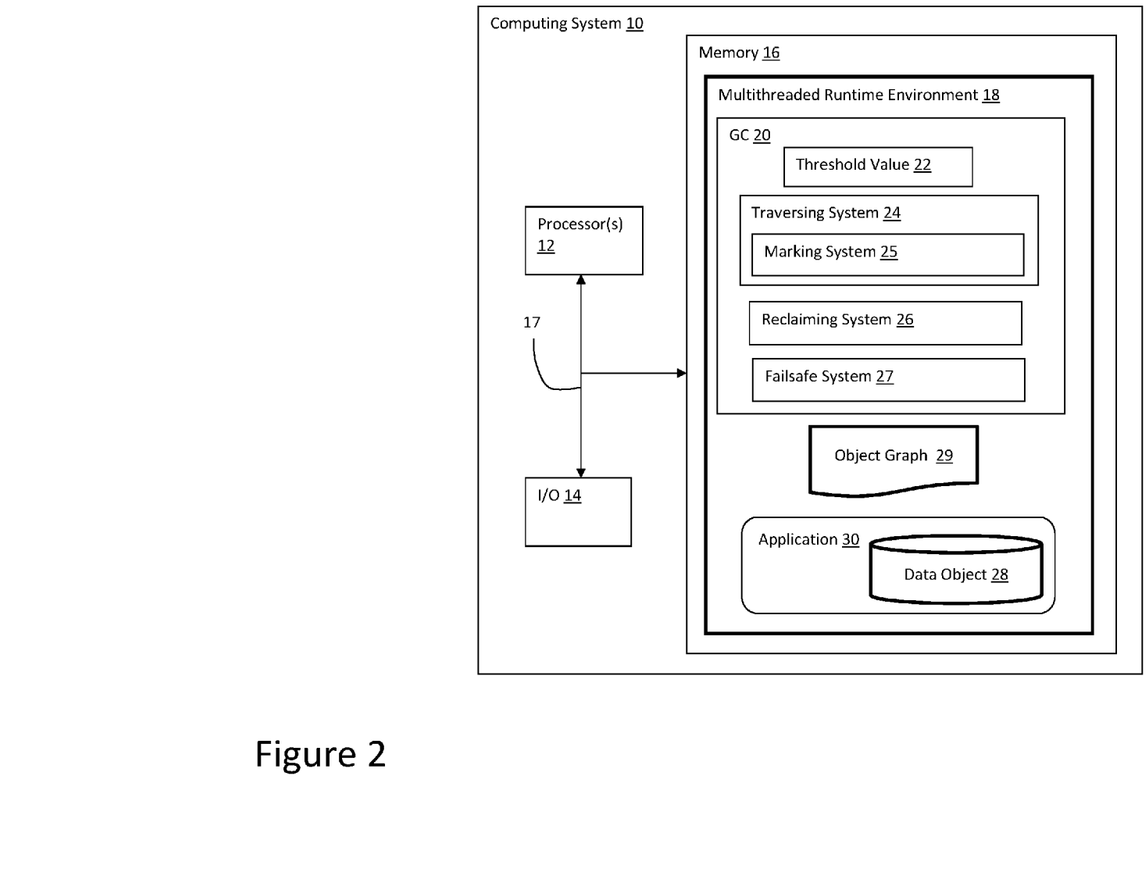
FIG. 2 shows a computing system showing a garbage collector in a multi-threaded runtime environment according to embodiments of the invention.

FIG. 2 depicts a computing system 10 having a multi-threaded runtime environment 18 (e.g., a Java Virtual Machine) for executing an application 30. Included in multithreaded runtime environment 18 is a garbage collector (GC) 20 for managing dynamically allocated data objects 28. In particular, GC 20 is responsible for reclaiming allocated data objects 28 from memory 16 that are no longer in use by application 30.

In this illustrative embodiment, GC 20 generally includes: a defined threshold value 22; a traversing system 24 for managing traversal of the object graph 29; a marking system 25 that tracks whether objects in the object graph are referenced or unreferenced, and tracks a cycle count for all unreferenced objects that have been observed as unreferenced; a reclaiming system 26 that reclaims unreferenced objects that have a cycle count greater than the threshold value; and a failsafe system 27 that ensures objects will not be inadvertently reclaimed.

Threshold value 22 may for example be hardcoded into the GC 20, inputted from an external source, dynamically inputted from application 30 during runtime. Threshold value 22 may be selected or determined in any manner to optimize performance and reduce risk. Note that in the illustrative embodiments described herein, traversing system 24 technically implements two traversal threads. Namely, a marker thread is implemented to traverse all the objects that are in-use (i.e., referenced) and a reclaiming thread is implemented to traverse all currently allocated objects (in order to reach objects that are determined to no longer be referenced).

The following is a listing of a high-level pseudocode example for implementing GC 20.

```
/* Larger values trade re-mark overhead for no longer referenced object
persistence/delay until collection. GC_CYCLE_LIFETIME_LAG is the Threshold Value in
this case and GC_CYCLE_REMARK_LAG is the value used by the failsafe system to
determine if the cycle count for an object is "near" the threshold. */
const int GC_CYCLE_REMARK_LAG   = 3
const int GC_CYCLE_LIFETIME_LAG = GC_CYCLE_REMARK_LAG + 1
global {
    int          gc_cycleNum;      // Current global cycle/generation number
    list         gc_alloc_list;    // List of all allocated client objects
    list         gc_root_list;     // Known set of currently live/in-use objects
    list         gc_remark_list;   // Objects that have escaped root-list marking
    sync_objects gc_sync;          //Makes the marker and collector threads loop
                                   // in lock-step, ensuring they never stray
                                   // more than one GC cycle apart.
}
// (3) threads
main_thread {
    gc_cycleNum = 1
    start_marker_thread( )
    start_collector_thread( )
    client_main( )
}
```

```
marker_thread {
  // MARKING SYSTERM
  loop {
    mark_all_subs( gc_root_list, gc_cycleNum )
    // REMARK PHASE - tracks the cycle count of unreferenced objects
    while ( gc_remark_list.count > 0 ) {
      let working_list = create_empty_list( )         // O(1)
      safe_swap( gc_remark_list, working_list )       // O(1)
      mark_all_subs( working_list, gc_cycleNum )
    }
    release_and_wait( gc_sync )
    gc_cycleNum = gc_cycleNum + 1
  }
}
// RECLAIMING SYSTEM
collector_thread {
  loop {
    for i in gc_alloc_list {
      if ( gc_cycleNum - i.gc_cycleNum > GC_CYCLE_LIFETIME_LAG ) {
        gc_alloc_list.remove( i )                     // O(1)
        gc_reclaim( i )
      }
    }
    release_and_wait( gc_sync )
  }
}
// Runtime call to allocate a new client object
function GC_alloc_obj( ) {
  let obj = alloc_block( )
  obj.gc_cycleNum = gc_cycleNum
  gc_root_list.add( obj )                             // O(1)
  return obj;
}
// Runtime call when client objects are moved into a container client objects -
Failsafe System
function GC_on_obj_move( obj ) {
  // Note for this block to be invoked (and the overhead of adding an
  //   object to the remark list to be spent), an object has to escape
  //   normal marking GC_CYCLE_REMARK_LAG number
  //   of times consecutively. Hence, increasing GC_CYCLE_REMARK_LAG makes the
  //   net-weighted expense of this function statistically approach negligible
  //   at an exponential rate.
  if ( gc_cycleNum - obj.gc_cycleNum > GC_CYCLE_REMARK_LAG ) {
    obj.gc_cycleNum = gc_cycleNum - 1;
    gc_remark_list.add( obj );                        // O(1)
  }
}
```

The following is a second example using lower-level C-style pseudocode example. In this case, the threshold value is five (3+2) and the failsafe can get triggered for an object after three GC cycles.

```
#define GC_CYCLE_REMARK_LAG        3
#define GC_CYCLE_LIFETIME_LAG = GC_CYCLE_REMARK_LAG + 2
struct obj_t {
    obj_t*      gc_next;          // (GC private) links all allocate objects
    int64       gc_cycleNum;      // (GC private) GC cycle number last witnessed
    function    gc_mark_subs;     // (GC private) walks and marks all contained
objs
    char[..]    payload;
}
struct GC_t {
    int64           cycleNum;     // garbage collection cycle/generation
    // Used to synchronize the GC marker and collector thread so they do not
    //   span further than one GC cycle apart.
    OS_semaphore            marker_idle;
    OS_semaphore            collector_idle;
    // Single linked list of all allocated objects (via obj_t's gc_next).
    // Allows the GC collector thread to walk the entire allocation set.
    obj_t                   alloc_head;
    // The tailmost item of all allocated items -- allows newly allocated
    //   objects are added to the global allocation list in O(1)
    obj_t*                  alloc_tail;
    list_t                  root_list;
    list_t                  remark_list;
    OS_mutex                remark_list_mutex;
}
```

```
// Global instance
global GC_t GC;
// Process main thread entry point
function main( ) {
    // Initialize GC
    GC.cycleNum = 1;
    GC.marker_done   = OS_semaphore_new( 1 );
    GC.collector_done = OS_semaphore_new( 1 );
        // Faux object that serves to head a linked list.
    GC.alloc_head.gc_next = nil;
    GC.alloc_tail = &GC.alloc_head;
    start_new_thread( &GC_marker_thread_main );
    start_new_thread( &GC_collector_thread_main );
    client_main( );
}
// Exclusively run in the marker thread
function GC_marker_thread_main( ) {
    while ( 1 ) {
    // Endlessly loop but stay in lock-step with the collector
    OS_wait( GC.collector_done );
    // MARK PHASE
    // Mark all live/in-use objects, expanding outward from the root set
    for ( obj_t* i in GC.root_list ) {
        i.gc_mark_subs( i, GC.cycleNum );
    }
    // REMARK PHASE
    // Iteratively converge on no more object to re-mark. Guarantee
    //   completion because GC_on_obj_move( ) has a decreasing set of eligible
    //   objects that could have escaped marking.
    while ( ! GC.remark_list.is_empty( ) ) {          // O(1)
        // Swap the live remark list with an empty one so no locks/synchronization
is needed below.
        OS_wait( GC.remark_list_mutex );
        list_t prev_remark_list = GC.remark_list;    // O(1)
        GC.remark_list.empty( );                      // O(1)
        OS_release( GC.remark_list_mutex );
            for ( obj_t* i in prev_remark_list ){
                i.gc_mark_subs( i, GC.cycleNum );
            }
    }
    GC.cycleNum++;
            // Make sure the collector loop stays lock-step with this loop.
    OS_release( GC.marker_done );
    }
}
// Exclusively run in the collector thread
function GC_collector_thead_main( ) {
    while ( 1 ) {
    // Stay in lock-step with the marker thread
    OS_wait( GC.marker_done );
    obj_t* prev = &GC.alloc_head;
    obj_t* i    = GC.alloc_head.gc_next;
    // Loop through ALL allocated objects and collect objects that have GC
    //   cycle stamps older than the largest allowed threshold. When we see
    //   an object older than this threshold, remove it from the single-linked
    //   list and proceed to collect/dispose/recycle it.
    while ( i ) {
        obj_t* next = i.gc_next;
        if ( GC.cycleNum - i.gc_cycleNum > GC_CYCLE_LIFETIME_LAG ) {
            prev.gc_next = next;
            OS_free( i );
        } else {
            prev = i;
        }
        i = next;
    }
    // Make sure the marker loop stays in lock-step with this loop
    OS_release( GC.collector_done );
    }
}
// Allocates a new garbage collected client object
function GC_alloc_obj ( ) {
    obj_t* obj = OS_alloc( sizeof(obj_t) );
    obj.gc_next      = nil;
    obj.gc_cycleNum = GC.cycleNum;
    // Add the new object to the single linked list of all objects
    assert( GC.alloc_tail.gc_next == nil );
    GC.alloc_tail.gc_next = obj;   // Update the tail's next ptr
    GC.alloc_tail = obj;            // Set the new tail
```

```
    return obj;
}
// Invoked by the runtime whenever an object is relocated to a new parent function
GC_on_obj_move( obj_t* obj ) {
    // Here, only add objects to the GCs remark list (below) if its c_cycleNum lags
    //    notably behind. This ensures that overhead spent on adding the object is
    //    only invoked in "failsafe" cases (i.e. seldom invoked in real-life). The
    //    if-block also serves as the base/limit case for when the GC marker thread
    //    is in its remark phase (and requires GC.remark_list to be empty before
    //    proceeding). Otherwise, GC.remark_list would fill as fast as it empties
    //    as client threads run and move objects.
    if ( GC.cycleNum - obj.gc_cycleNum > GC_CYCLE_REMARK_LAG ) {
        // The following line serves 3 purposes:
        //    (1) it ensures forward progress during the remark phase since we
        //    update an object's gc_cycleNum so it will not be in this block again for
        //    the current GC cycle. This is ensured because the above if-condition is
        //    no longer met by updating the object's gc_cycleNum below.
        //    (2) it ensures that objects that escape marking are marked if/when they
        //    escape parent objects that have yet to be re-marked. This is rare but
required
        //    for correctness. Note that objects that stop moving are assured to be
visited
        //    during the mark phase.
        //    (3) it ensures that objects are not stamped with a cycle number that
will cause them
        //    to be skipped while executing gc_mark_subs( ). This is ensured because
objects are
        //    re-marked with (GC.cycleNum-1, not GC.cycleNum).
        obj.gc_cycleNum = GC.cycleNum - 1;
        // Add the object remarking in the remark phase.
        OS_wait( GC.remark_list_mutex );
        GC.remark_list.add( obj );                      // O(1)
        OS_release( GC.remark_list_mutex );
    }
}
```

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts an illustrative computing system 10 that may comprise any type of computing device and, and for example includes at least one processor 12, memory 16, an input/output (I/O) 14 (e.g., one or more I/O interfaces and/or devices), and a communications pathway 17. In general, processor(s) 12 execute program code, such as a runtime environment 18, which is at least partially fixed in memory 16. While executing program code, processor(s) 12 can process data, which can result in reading and/or writing transformed data from/to memory 16 and/or I/O 14 for further processing. Pathway 17 provides a communications link between each of the components in computer system 10. I/O 14 can comprise one or more human I/O devices, which enable a user to interact with computer system 10. To this extent, dynamic language compiler 18 can manage a set of interfaces (e.g., graphical user interfaces, application program interfaces, etc.) that enable humans and/or other systems to interact with the runtime environment 18. Further, runtime environment 18 can manage (e.g., store, retrieve, create, manipulate, organize, present, etc.) data using any solution.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for providing garbage collection (GC) to manage dynamically allocated memory in a multithreaded runtime environment, comprising:
defining a threshold value, wherein the threshold value defines a number of GC cycles an object must be observed as unreferenced before being reclaimed;
traversing objects in an object graph, wherein the object graph specifies objects stored in dynamically allocated memory that are accessible by different threads running in the multithreaded runtime environment;
reclaiming a traversed object from the dynamically allocated memory when the traversed object has been observed as unreferenced for more than the threshold value unless a failsafe condition is detected, wherein the failsafe condition occurs when an object in use is moved elsewhere in the object graph by an associated application running in the multithreaded runtime environment while the object graph is traversed causing the object to be observed as unreferenced; and
in response to a detection of the failsafe condition, allowing the traversed object to remain in the object graph for at least one additional cycle.

2. The method of claim 1, wherein traversing includes:
a first process that traverses all the objects that are in-use to identify all referenced and unreferenced objects; and
a second process that traverses all of the currently allocated objects in order to reach allocated objects that are unreferenced.

3. The method of claim 2, wherein if an unreferenced object in the object graph is not reclaimed, a cycle count associated with the unreferenced object is incremented.

4. The method of claim 3, wherein the cycle count is decremented in response to a failsafe condition in which the unreferenced object is moved to a different container object by an associated application running in the multithreaded runtime environment and the cycle count associated with the unreferenced object is within one or two cycles of the threshold value.

5. The method of claim 1, wherein the threshold value is hardcoded by the multithreaded runtime environment.

6. The method of claim 1, wherein the threshold value is inputted from a program running in the multithreaded runtime environment.

7. The method of claim 1, wherein the traversing and reclaiming are performed by different threads of the multi-threaded runtime environment than a user/client thread.

8. A garbage collection (GC) system that manages dynamically allocated memory in a multithreaded runtime environment on a computing system, the GC system comprising:
- a processor and a memory;
- a threshold value stored in the memory, wherein the threshold value defines a number of GC cycles an object must be observed as unreferenced before being reclaimed;
- a first GC system for traversing objects in an object graph, wherein the object graph specifies objects stored in dynamically allocated memory that are accessible by different threads running in the multithreaded runtime environment;
- a second GC system for reclaiming a traversed object from the dynamically allocated memory if the traversed object has been observed as unreferenced for more than the threshold value unless a failsafe condition is detected, wherein the failsafe condition occurs when an object is moved elsewhere in the object graph by an associated application while the object graph is traversed by the first GC system causing the object to appear as unreferenced; and
- a failsafe system for detecting the failsafe condition, and in response to a detection of the failsafe condition, allowing the traversed object to remain in the object graph for at least one additional cycle.

9. The system of claim 8, wherein the system for traversing includes:
- a first process that traverses all the objects that are in-use to mark all referenced and unreferenced objects; and
- a second process that traverses all of the currently allocated objects in order to reach allocated objects that are unreferenced.

10. The system of claim 9, wherein if an unreferenced object in the object graph is not reclaimed, a cycle count associated with the unreferenced object is incremented.

11. The system of claim 10, wherein the cycle count is decremented by the failsafe system if the unreferenced object is moved to a different container object by an associated application running in the multithreaded runtime environment and the cycle count associated with the unreferenced object is within one or two cycles of the threshold value.

12. The system of claim 8, wherein the threshold value is hardcoded by the multithreaded runtime environment.

13. The system of claim 8, wherein the threshold value is inputted from a program running in the multithreaded runtime environment.

14. A computer program product stored on a computer readable storage medium, which when executed by a computer system provides garbage collection (GC) that manages dynamically allocated memory in a multithreaded runtime environment, the program product comprising:
- program code for defining a threshold value, wherein the threshold value defines a number of GC cycles an object must be observed as unreferenced before being reclaimed;
- program code for traversing objects in an object graph, wherein the object graph specifies objects stored in dynamically allocated memory that are accessible by different threads running in the multithreaded runtime environment; and
- program code for reclaiming a traversed object from the dynamically allocated memory if the traversed object has been observed as unreferenced for more than the threshold value unless a failsafe condition of the traversed object is detected, wherein the failsafe condition occurs when an object in use is moved elsewhere in the object graph by an associated application while the object graph is traversed causing the object to appear as unreferenced.

15. The computer program product of claim 14, wherein the program code for traversing includes:
- a first thread that traverses all the objects that are in-use to mark all referenced and unreferenced objects; and
- a second thread that traverses all of the currently allocated objects in order to reach allocated objects that are unreferenced.

16. The computer program product of claim 15, wherein if an unreferenced object in the object graph is not reclaimed, a cycle count associated with the unreferenced object is incremented.

17. The computer program product of claim 16, wherein the cycle count is decremented if the unreferenced object is moved to a different container object by an associated application running in the multithreaded runtime environment and the cycle count associated with the unreferenced object is within one or two cycles of the threshold value.

18. The computer program product of claim 14, wherein the threshold value is hardcoded by the multithreaded runtime environment.

19. The computer program product of claim 14, wherein the threshold value is inputted from a program running in the multithreaded runtime environment.

20. The computer program product of claim 14, wherein the program code for traversing and reclaiming are performed by different threads of the multithreaded runtime environment that a user/client thread.

* * * * *